US 11,453,476 B2

(12) United States Patent
Gruner et al.

(10) Patent No.: US 11,453,476 B2
(45) Date of Patent: Sep. 27, 2022

(54) STRUCTURAL COMPOSITE AIRFOILS WITH AN IMPROVED LEADING EDGE, AND RELATED METHODS

(71) Applicant: The Boeing Company, Chicago, IL (US)

(72) Inventors: Bryan Gruner, Bellevue, WA (US); Jan A. Kordel, Redmond, WA (US); Peter Schupp, Seattle, WA (US); Kyle Alexander Johnson, Fall City, WA (US); Ross Westermeier, Seattle, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 16/880,082

(22) Filed: May 21, 2020

(65) Prior Publication Data

US 2021/0362831 A1    Nov. 25, 2021

(51) Int. Cl.
*B64C 9/00* (2006.01)
*B64C 3/26* (2006.01)
(Continued)

(52) U.S. Cl.
CPC ............... *B64C 9/00* (2013.01); *B64C 3/185* (2013.01); *B64C 3/26* (2013.01); *B64C 9/18* (2013.01); *B64F 5/10* (2017.01)

(58) Field of Classification Search
CPC ..... B64F 5/10; B64C 3/48; B64C 9/00; B64C 3/18; B64C 3/182; B64C 3/185; B64C 3/187; B64C 3/28; B64C 3/26
See application file for complete search history.

(56) References Cited

U.S. PATENT DOCUMENTS 1,803,030 A    7/1929    Messerschmitt
1,875,593 A    9/1932    Hall
(Continued)

FOREIGN PATENT DOCUMENTS

BR    102017007099 A2    10/2017
CA        3000916 A1    12/2018
(Continued)

OTHER PUBLICATIONS

English language machine translation of Brazilian Patent Application Publication No. BR102017007099A2, published Oct. 10, 2017.
(Continued)

*Primary Examiner* — Joshua J Michener
*Assistant Examiner* — Cindi M Curry
(74) *Attorney, Agent, or Firm* — Dascenzo Gates Intellectual Property Law, P.C.

(57) ABSTRACT

Structural composite airfoils include a front C-channel spar having an upper flange coupled to an upper skin panel, and a lower flange coupled to a lower skin panel. The lower skin panel includes a joggle adjacent a lower leading edge end, with the joggle being positioned forward of the front C-channel spar. An upper skin surface of the lower leading edge end faces an internal volume defined between the upper skin panel and the lower skin panel. A lower skin surface of the lower leading edge end faces an internal surface of the upper leading edge end of the upper skin panel, and the lower leading edge end of the lower skin panel is coupled to the upper leading edge end of the upper skin panel forward of the front C-channel spar. The leading edge has a bullnose shape defined by the upper skin panel.

19 Claims, 5 Drawing Sheets

(51) Int. Cl.
*B64C 9/18* (2006.01)
*B64F 5/10* (2017.01)
*B64C 3/18* (2006.01)

(56) References Cited

U.S. PATENT DOCUMENTS

| | | | |
|---|---|---|---|
| 3,167,129 A | 1/1965 | Shultz | |
| 3,333,642 A * | 8/1967 | Kee | B64C 27/473 |
| | | | 416/241 R |
| 3,910,531 A | 10/1975 | Leomand | |
| 3,994,452 A | 11/1976 | Cole | |
| 5,843,355 A | 12/1998 | McCarville et al. | |
| 6,375,120 B1 | 4/2002 | Wolnek | |
| 7,393,183 B2 | 7/2008 | Keller | |
| 8,684,309 B2 | 4/2014 | Wildman | |
| 8,853,313 B2 | 10/2014 | Miller | |
| 9,522,504 B2 | 12/2016 | Garcia Martin et al. | |
| 9,656,738 B2 * | 5/2017 | Murta | B64C 3/185 |
| 9,745,048 B2 | 8/2017 | Wood | |
| 10,173,789 B2 | 1/2019 | Rodman | |
| 10,228,005 B2 * | 3/2019 | Wilson | B64C 3/14 |
| 10,532,804 B2 * | 1/2020 | Santini | B64C 9/16 |
| 2005/0227582 A1 * | 10/2005 | Kloos | A63H 17/002 |
| | | | 446/488 |
| 2005/0238491 A1 | 10/2005 | Morrison et al. | |
| 2008/0258008 A1 * | 10/2008 | Cooper | B64C 1/12 |
| | | | 244/131 |
| 2010/0308170 A1 * | 12/2010 | Hadley | B64C 1/12 |
| | | | 156/244.11 |
| 2015/0353185 A1 | 12/2015 | Petiot et al. | |
| 2016/0244143 A1 | 8/2016 | Foster et al. | |
| 2018/0043639 A1 | 2/2018 | Autry et al. | |
| 2018/0086429 A1 | 3/2018 | Sheppard | |
| 2018/0127080 A1 | 5/2018 | Tyler et al. | |
| 2018/0155004 A1 | 6/2018 | Woolcock | |
| 2018/0222571 A1 | 8/2018 | Santini | |
| 2018/0346094 A1 | 12/2018 | Deck et al. | |
| 2019/0061901 A1 | 2/2019 | Long | |

FOREIGN PATENT DOCUMENTS

| | | |
|---|---|---|
| DE | 3726909 A1 | 2/1989 |
| EP | 1176089 | 1/2002 |
| EP | 3360778 | 8/2018 |
| EP | 3409580 | 12/2018 |
| GB | 2266085 A | 10/1993 |
| WO | WO 2014/170690 | 10/2014 |

OTHER PUBLICATIONS

English language machine translation of German Patent Application Publication No. DE3726909A1, published Feb. 23, 1989.

* cited by examiner

STRUCTURAL COMPOSITE AIRFOILS WITH AN IMPROVED LEADING EDGE, AND RELATED METHODS

FIELD

The present disclosure relates generally to structural composite airfoils and related methods.

BACKGROUND

Aircraft, including fixed-wing aircraft and rotary-wing aircraft, employ a variety of aerodynamic control surfaces, such as ailerons, air brakes, elevators, flaps, rudders, slats, spoilers and the like. By manipulating one or more of the aerodynamic control surfaces, a pilot may control the lift generated by the aircraft, such as during takeoff, climbing, descending and landing, as well as the aircraft's orientation about its pitch, roll, and yaw axes. For example, the trailing edge of a wing of a fixed-wing aircraft typically includes one or more flaps, with the flaps being moveable between retracted and extended positions. At cruise, the flaps are typically maintained in a retracted position. When extended, the flaps increase the camber of the wing. Therefore, during takeoff, climbing, descending, or landing, the flaps may be extended, either partially or fully, to increase the maximum lift coefficient and effectively reduce the stalling speed of the aircraft. Said aerodynamic control surfaces are typically airfoils formed of composite materials, and thus are referred to herein as structural composite airfoils.

Structural composite airfoils, such as flaps, have an aerodynamic cross-sectional profile that is typically formed by connecting an upper skin to a lower skin proximate both the leading edge and the trailing edge of the structural composite airfoil. In conventional construction of inboard and outboard flaps, for example, a primary structural element of the flap is defined by the upper and lower skins being coupled to three spars that extend the width of the flap. The leading edge of the structural composite airfoil (which typically includes a bullnose shape), and the trailing edge (which is tapered to a thin cross-section) are typically outside of the primary structural element, forming respective secondary structural elements of the flap. Various fasteners and components (e.g., splice straps and/or nut plates) are used to secure the upper and lower skins to the spars and other structures that form the flap. Large numbers of fasteners can increase costs, manufacturing cycle time, and weight of the resulting assemblies. Accordingly, those skilled in the art continue research and development efforts directed to improving structural composite airfoils and the manufacturing thereof.

SUMMARY

Disclosed structural composite airfoils and related methods of forming said structural composite airfoils may reduce fastener counts, improve airfoil aerodynamic surfaces, and/or simplify manufacturing processes for structural composite airfoils.

An example of a structural composite airfoil according to the present disclosure includes a primary structural element, and a secondary structural element defining a trailing edge of the structural composite airfoil. The primary structural element extends from a leading edge region (30) to a trailing edge region, with the leading edge region (30) of the primary structural element forming a leading edge of the structural composite airfoil in some examples. The primary structural element includes an upper skin panel extending from an upper leading edge end to an upper trailing edge end, a lower skin panel extending from a lower leading edge end to a lower trailing edge end, and a front C-channel spar. An internal volume is defined between the upper skin panel and the lower skin panel.

The front C-channel spar includes an upper flange coupled to the upper skin panel, as well as a lower flange coupled to the lower skin panel. The lower skin panel includes a joggle adjacent the lower leading edge end, with the joggle being positioned forward of the front C-channel spar. An upper skin surface of the lower leading edge end faces the internal volume, and a lower skin surface of the lower leading edge end faces an internal surface of the upper leading edge end of the upper skin panel. The lower leading edge end of the lower skin panel is coupled to the upper leading edge end of the upper skin panel forward of the front C-channel spar. The leading edge region (30) of the primary structural element of disclosed structural composite airfoils has a bullnose shape defined by the upper skin panel.

Methods of assembling said structural composite airfoils are also disclosed. Disclosed methods generally include coupling the upper skin panel to an upper flange of the front C-channel spar and coupling a lower skin panel to a lower flange of the front C-channel spar such that an internal volume is defined between the upper skin panel and the lower skin panel. Methods also include forming the leading edge of the structural composite airfoil with the upper skin panel, forming a joggle in the lower skin panel, and coupling the lower leading edge end of the lower skin panel to the upper leading edge end of the upper skin panel. The lower skin panel may be coupled to the front C-channel spar aft of the joggle.

DESCRIPTION

Figure 1:
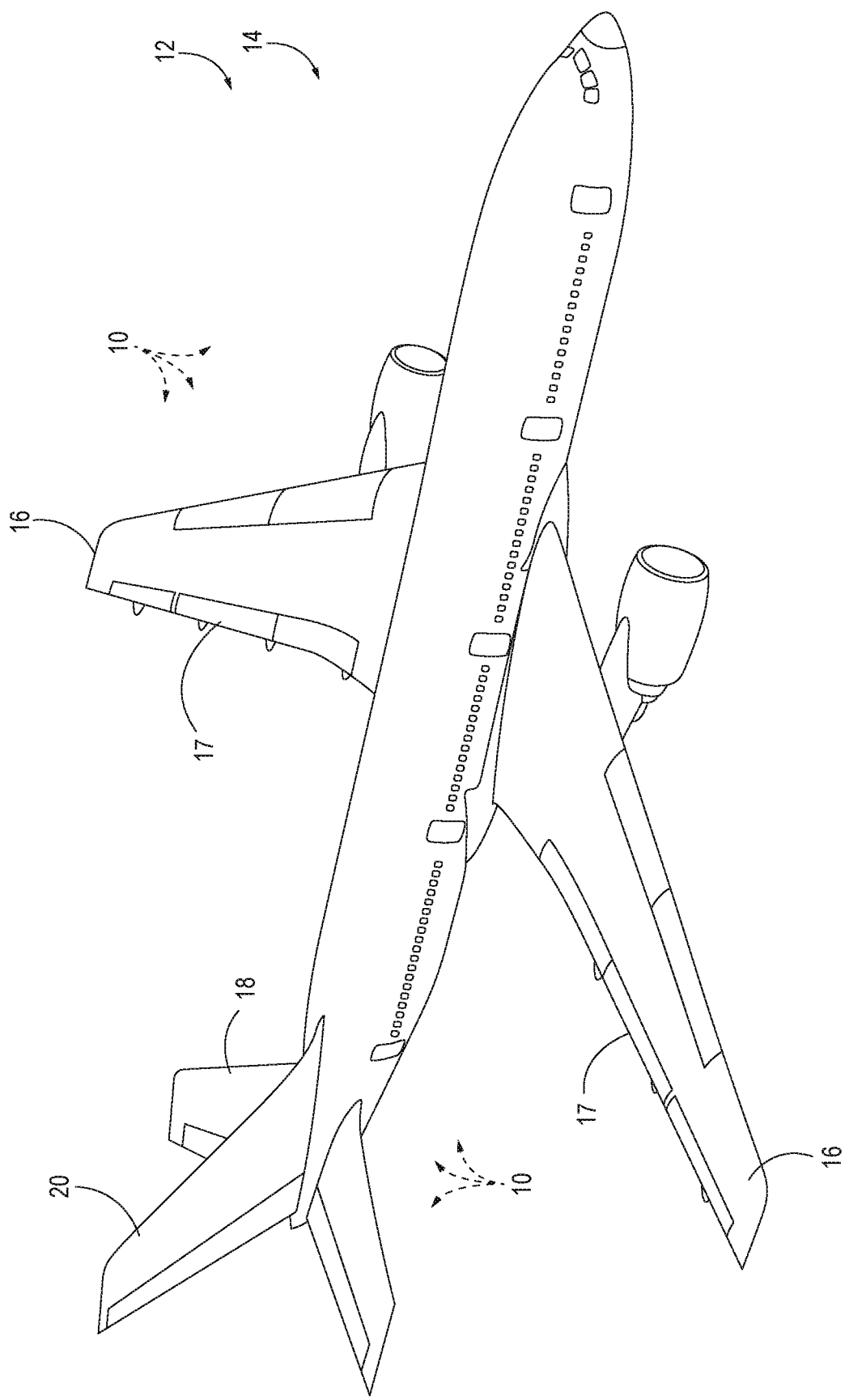
FIG. 1 is a schematic representation of an apparatus that may include one or more structural composite airfoils according to the present disclosure.

With reference to FIG. 1, one or more structural composite airfoils 10 may be included in an apparatus 12. Structural composite airfoils 10 may be utilized in many different industries and applications, such as the aerospace, automotive, military, architecture, wind power generation, remote control aircraft, marine, recreation, and/or motorsport industries. In FIG. 1, an example of apparatus 12 that may include one or more structural composite airfoils 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) rotorcraft and helicopters.

Apparatus 12 (e.g., aircraft 14) may include one or more structural composite airfoils 10. As illustrative, non-exclusive examples, structural composite airfoils 10 may be utilized in wings 16 (e.g., flaps 17, which may be inboard or outboard flaps), though other components of aircraft 14, such as horizontal stabilizers 18, vertical stabilizers 20, and others additionally or alternatively may include one or more structural composite airfoils 10. Other applications in aircraft 14 (or other apparatus 12) for structural composite airfoils 10 may include other wing control surfaces, ailerons, flaperons, air brakes, elevators, slats, spoilers, canards, rudders, and/or winglets. In other industries, examples of apparatus 12 (including one or more structural composite airfoils 10) may include or be a portion of space satellites, transit vehicles, shipping containers, rapid transit vehicles, automobile bodies, propeller blades, turbine blades, and/or marine vehicles, among others.

Figure 2:
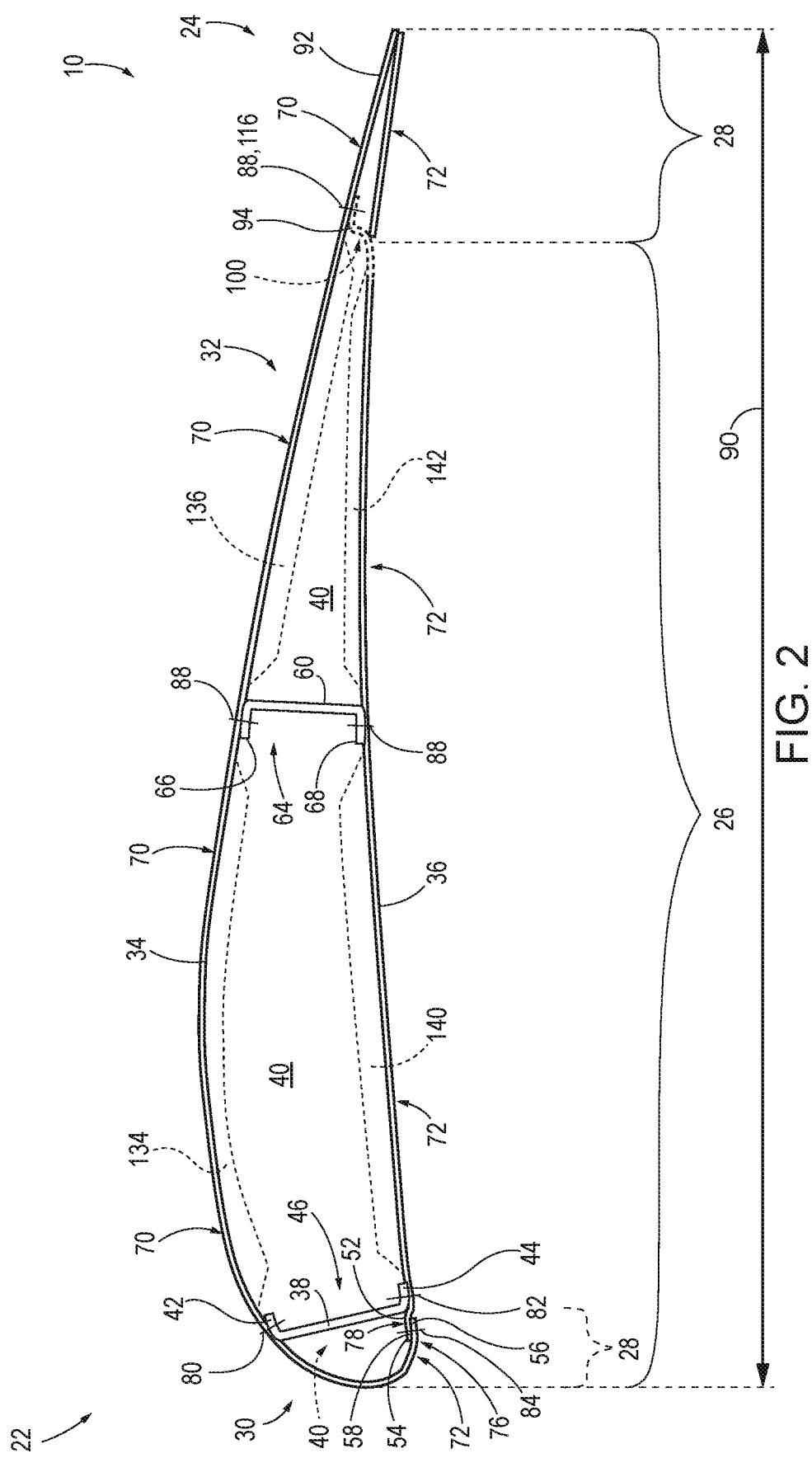
FIG. 2 is a schematic, side elevation representation of examples of structural composite airfoils according to the present disclosure.

FIG. 2 provides illustrative, non-exclusive examples of structural composite airfoils 10 according to the present disclosure. In general, elements that are likely to be included are illustrated in solid lines, while elements that are optional are illustrated in dashed lines. However, elements that are shown in solid lines are not essential to all examples, and an element shown in solid lines may be omitted from a particular example without departing from the scope of the present disclosure.

Structural composite airfoil 10 has a leading edge 22 and a trailing edge 24, and generally includes a primary structural element 26 and a secondary structural element 28. As used herein, a "primary structural element" is an element or structure which carries flight, ground, or pressurization loads, and whose failure would reduce the structural integrity of the apparatus or assembly of which structural composite airfoil 10 is a part. As used herein, a "secondary structural element" is an element or structure whose failure does not affect the safety of the apparatus or assembly of which structural composite airfoil 10 is a part. Primary structural element 26 extends from a leading edge region 30 to a trailing edge region 32. As shown in FIG. 2, leading edge region 30 may define, or form, leading edge 22 of structural composite airfoil 10, with primary structural element 26 extending forward to leading edge 22. In other examples, leading edge 22 may be a portion of secondary structural element 28, with primary structural element 26 extending forward to a front C-channel spar 38.

Leading edge 22 (which may correspond to leading edge region 30, in some examples) generally has a bullnose shape defined by an upper skin panel 34. Currently disclosed structural composite airfoils 10, therefore, may provide an aerodynamic advantage in providing leading edge 22 without disruptions in the leading edge surface, and/or without discrete structures or components forming leading edge 22. Trailing edge region 32 may be said to be the region of primary structural element 26 that is closest to trailing edge 24, though trailing edge region 32 of primary structural element 26 does not define trailing edge 24 of structural composite airfoil 10 in the example shown in FIG. 2. As used herein, a first element or structure is said to be "aft" of another element or structure if the first element or structure is positioned closer to trailing edge 24 than is the other element or structure. Similarly, as used herein, a first element or structure is said to be "forward" of another element or structure if the first element or structure is positioned closer to leading edge 22 than is the other element or structure.

Primary structural element 26 includes at least upper skin panel 34, a lower skin panel 36, and front C-channel spar 38. An internal volume 40 is defined within primary structural element 26 between upper skin panel 34 and lower skin panel 36. In FIG. 2, internal volume 40 is indicated forward of front C-channel spar 38, as well as aft of front C-channel spar 38, which corresponds to examples where primary structural element 26 extends forward to leading edge 22. However, in examples where primary structural element 26 does not extend forward of front C-channel spar 38, internal volume 40 would also not extend forward of front C-channel spar 38. Front C-channel spar 38 includes an upper flange 42 and a lower flange 44, with upper flange 42 being coupled to upper skin panel 34, and lower flange 44 being coupled to lower skin panel 36. A first channel 46 of front C-channel spar 38 faces trailing edge 24 of structural composite airfoil 10. Examples of presently disclosed structural composite airfoils 10 may advantageously provide for interfacing between components or elements without utilizing splice straps, and/or may allow for a part count reduction by reducing or eliminating the number of splice straps, nut plates, and/or other fasteners used in assembling structural composite airfoils 10.

Upper skin panel 34 generally extends from upper leading edge end 76 to an upper trailing edge end 92. Upper leading edge end 76 corresponds to the end of upper skin panel 34 that is closest to leading edge 22 of structural composite airfoil 10, and upper trailing edge end 92 corresponds to the end of upper skin panel 34 that is closest to trailing edge 24 of structural composite airfoil 10. Upper skin panel 34 may be continuous from upper leading edge end 76 to upper trailing edge end 92, and thus may be continuous from trailing edge 24 all the way along an upper airfoil surface 70, and around the bullnose of leading edge 22 to a location where upper leading edge end 76 is coupled to lower skin panel 36 (e.g., lower leading edge end 78). Similarly, lower skin panel 36 generally extends from lower leading edge end 78 to a lower trailing edge end 94. Lower leading edge end 78 corresponds to the end of lower skin panel 36 that is closest to leading edge 22, and lower trailing edge end 94 corresponds to the end of lower skin panel 36 that is closest to trailing edge 24. Upper leading edge end 76 and lower leading edge end 78 are coupled to each other forward of front C-channel spar 38. Upper trailing edge end 92 may be coupled to lower trailing edge end 94, in some examples. Additionally or alternatively, upper trailing edge end 92 and/or lower trailing edge end 94 may form or define trailing edge 24 of structural composite airfoil 10.

To facilitate the interface between upper skin panel 34 and lower skin panel 36, lower skin panel 36 includes a joggle 52 adjacent lower leading edge end 78. Joggle 52 is positioned forward of front C-channel spar 38 and effectively corresponds to a shift in lower skin panel 36 upwards towards upper skin panel 34, in order to receive upper leading edge end 76 of upper skin panel 34. In some examples, joggle 52 replaces the need for splice straps to couple upper skin panel 34 to lower skin panel 36. In this arrangement, an upper skin surface 54 of lower leading edge end 78 faces internal volume 40, while a lower skin surface 56 of lower leading edge end 78 faces an internal surface 58 of upper leading edge end 76 at the interface between upper leading edge end 76 and lower leading edge end 78. In this manner, lower leading edge end 78 of lower skin panel 36 is coupled to upper leading edge end 76 at a position forward of front C-channel spar 38. In some examples, and as shown in FIG. 2, lower flange 44 of front C-channel spar 38 may be aft of, but adjacent to joggle 52. Additionally or alternatively, lower flange 44 may be complementary in shape to joggle 52. Any gap adjacent joggle 52 (e.g., any disruption in a lower airfoil surface 72) may be filled with a sealant or filler material and smoothed to create an aerodynamically advantageous surface.

Structural composite airfoil 10 has upper airfoil surface 70 and lower airfoil surface 72. Upper airfoil surface 70 is defined by upper skin panel 34, and extends from a midpoint of the bullnose shape of leading edge 22 to trailing edge 24, along the upper side of structural composite airfoil 10. Lower airfoil surface 72 may be defined by both upper skin panel 34 and lower skin panel 36. For example, upper leading edge end 76 of upper skin panel 34 forms part of lower airfoil surface 72 adjacent leading edge 22. Additionally or alternatively, lower airfoil surface 72 may be partially defined by secondary structural element 28.

Trailing edge 24 of structural composite airfoil 10 may be defined by secondary structural element 28. In various examples of structural composite airfoil 10, secondary structural element 28 may include a wedge closeout, a duckbill closeout, a bonded closeout, and/or a riveted closeout. Examples of suitable trailing edge closeouts are also disclosed in U.S. Pat. No. 10,532,804, issued on Jan. 14, 2020, and titled AERODYNAMIC CONTROL SURFACE AND ASSOCIATED TRAILING EDGE CLOSE-OUT METHOD, the entire disclosure of which is hereby incorporated by reference herein in its entirety, for all purposes. Upper trailing edge end 92 of upper skin panel 34 may be coupled to secondary structural element 28, and/or may be coupled to lower skin panel 36 (e.g., lower trailing edge end 94). In the example shown in FIG. 2, lower trailing edge end 94 is coupled to upper skin panel 34 forward of upper trailing edge end 92, upper trailing edge end 92 extends to trailing edge 24 of structural composite airfoil 10, and secondary structural element 28 is coupled to both lower skin panel 36 and to upper skin panel 34 adjacent upper trailing edge end 92.

Structural composite airfoil 10 may include one or more fasteners securing various components to each other, as will be appreciated by those of ordinary skill in the art. For example, a first fastener 80 may couple upper skin panel 34 to upper flange 42 of front C-channel spar 38. In some examples, first fastener 80 is a plurality of first fasteners 80 securing upper skin panel 34 to front C-channel spar 38, spaced apart along the width of structural composite airfoil 10 (the width of the airfoil extending into/out of the page). A second fastener 82 may couple lower skin panel 36 to lower flange 44 of front C-channel spar 38. Similar to first fastener 80, in some examples, second fastener 82 is a plurality of second fasteners 82 securing lower skin panel 36 to front C-channel spar 38, spaced apart along the width of structural composite airfoil 10 (the width of the airfoil extending into/out of the page).

A third fastener 84 couples upper leading edge end 76 to lower leading edge end 78. While third fastener 84 may be utilized to couple upper skin panel 34 to lower skin panel 36, some examples of structural composite airfoils 10 may allow limiting or reducing the number of fasteners used. For example, upper skin panel 34 may be configured to directly interface with lower skin panel 36 without a splice strap between the two panels, and/or using a reduced number of (and/or zero) nut plates or other fastening components. In some examples, structural composite airfoils 10 according to the present disclosure may allow for faster assembly due to using fasteners having a faster installation time than for prior art airfoils.

Structural composite airfoil 10 may further include a middle C-channel spar 60, which may form part of primary structural element 26. In the example shown in FIG. 2, primary structural element 26 extends between leading edge 22 and an integral Z-spar 100 (discussed in more detail below with reference to FIGS. 3-4), and includes front C-channel spar 38, middle C-channel spar 60, and the respective portions of upper skin panel 34 and lower skin panel 36 extending between leading edge 22 and integral Z-spar 100. In other examples of structural composite airfoil 10, primary structural element 26 may extend further aft towards trailing edge 24 than illustrated in FIG. 2, and/or primary structural element 26 may extend to a lesser extent forward towards leading edge 22. For example, primary structural element 26 may be defined between front C-channel spar 38 and integral Z-spar 100, rather than extending all the way to forward leading edge 22 in some examples. In such examples, the portion of structural composite airfoil 10 forward of front C-channel spar 38 may be a secondary structure (e.g., part of secondary structural element 28, which may be two or more different elements or portions of structural composite airfoil 10).

In examples including middle C-channel spar 60, said middle C-channel spar 60 may include a second channel 64 facing leading edge 22. Middle C-channel spar 60 may be coupled to upper skin panel 34 and lower skin panel 36. For example, middle C-channel spar 60 may include a middle upper flange 66 coupled to upper skin panel 34. Additionally or alternatively, middle C-channel spar 60 may include a middle lower flange 68 coupled to lower skin panel 36. Middle C-channel spar 60 is positioned aft of front C-channel spar 38. A plurality of other fasteners 88 may be utilized to couple upper skin panel 34 to middle C-channel spar 60 (e.g., middle upper flange 66) and/or to couple lower skin panel 36 to middle C-channel spar 60 (e.g., middle lower flange 68). Additionally or alternatively, one or more fasteners 88 may be used to couple upper trailing edge end 92 to lower trailing edge end 94.

Each of upper skin panel 34 and lower skin panel 36 may be a composite panel formed of a plurality of layers (plies) of a fiber-reinforced polymer laminated together. For example, upper skin panel 34 and lower skin panel 36 may be formed of carbon fiber reinforced polymer material or fiberglass reinforced polymer material. In other examples, upper skin panel 34 and/or lower skin panel 36 may be a metallic, polymer, or other suitable material.

In some examples, at least a portion of upper skin panel 34 may be core stiffened. As used herein, "core stiffened" refers to skin panels having at least a first skin and a low density core material coupled to the skin. Core stiffened materials optionally include a second skin, with the core material sandwiched between the first and second skins to form a sandwich panel. Suitable materials for forming core stiffened portions are well known in the art, and include honeycomb core materials and metallic core materials, though other core materials are within the scope of the present disclosure. As an illustrative example, upper skin panel 34 includes a first upper core stiffened portion 134 and a second upper core stiffened portion 136. First upper core stiffened portion 134 may be positioned between front C-channel spar 38 and middle C-channel spar 60, and/or second upper core stiffened portion 136 may be positioned between middle C-channel spar 60 and integral Z-spar 100 (or upper trailing edge end 92). One or more of upper core stiffened portions 134, 136, may be tapered, such as in areas of the respective section near a C-channel spar. For example, upper core stiffened portion 134 and/or 136 may have a height or thickness extending downward from upper skin panel 34 towards lower skin panel 36, with said height or thickness decreasing in the vicinity of one or more of front C-channel spar 38, middle C-channel spar 60, and/or integral Z-spar 100, thereby forming the taper. In the example of FIG. 2, the thickness of first upper core stiffened portion 134 is tapered adjacent front C-channel spar 38 and adjacent middle C-channel spar 60, and the thickness of second upper core stiffened portion 136 is tapered adjacent middle C-channel spar 60 and integral Z-spar 100. In other examples, the height or thickness of upper core stiffened portion 134 and/or 136 may be substantially constant, rather than tapering where the respective upper core stiffened portion 134 and/or 136 meets the respective spar 38, 60, and/or 100. In some examples, upper core stiffened portion 134 and/or 136 may abut a respective spar 38, 60, and/or 100. While upper skin panel 34 as shown in FIG. 2 includes two distinct upper core stiffened portions 134, 136, in other examples, upper skin panel 34 may be core stiffened along its entire length, may be core stiffened along a greater or lesser portion of its length, and/or may include more or fewer discrete upper core stiffened portions than is shown in FIG. 2.

Additionally or alternatively, at least a portion of lower skin panel 36 may be core stiffened. As an illustrative example, lower skin panel 36 includes a first lower core stiffened portion 140 and a second lower core stiffened portion 142. First lower core stiffened portion 140 may be positioned between front C-channel spar 38 and middle C-channel spar 60, and/or second lower core stiffened portion 142 may be positioned between middle C-channel spar 60 and integral Z-spar 100 (or lower trailing edge end 94). One or more of lower core stiffened portions 140, 142 may be tapered, such as in areas of the respective section near a C-channel spar. For example, lower core stiffened portion 140 and/or 142 may have a height or thickness extending upward from lower skin panel 36 towards upper skin panel 34, with said height or thickness decreasing in the vicinity of one or more of the C-channel spars 38, 60, and/or integral Z-spar 100, thereby forming the taper. In the example of FIG. 2, the thickness of first lower core stiffened portion 140 is tapered adjacent front C-channel spar 38 and adjacent middle C-channel spar 60, and the thickness of second lower core stiffened portion 142 is tapered adjacent middle C-channel spar 60 and integral Z-spar 100. In other examples, the height or thickness of lower core stiffened portion 140 and/or 142 may be substantially constant, rather than tapering where the respective lower core stiffened portion 140 and/or 142 meets the respective spar 38, 60, and/or 100. In some examples, one or more of lower core stiffened portions 140, 142, and/or 144 may abut a respective C-channel spar 38, 60, and/or integral Z-spar 100. While lower skin panel 36 as shown in FIG. 2 includes two distinct lower core stiffened portions 140, 142, in other examples, lower skin panel 36 may be core stiffened along its entire length, may be core stiffened along a greater or lesser portion of its length, and/or may include more or fewer discrete lower core stiffened portions than is shown in FIG. 2.

Structural composite airfoil 10 has a length 90, which may also be referred to herein as a chord length 90, and a position along length 90 may be defined in terms of a percentage of the distance along length 90 from leading edge 22. In these terms, front C-channel spar 38 may be positioned between 0%-10% of length 90 away from leading edge 22. In specific examples, front C-channel spar 38 is positioned at about 5% of length 90 away from leading edge 22. Front C-channel spar 38 may be positioned as far forward as practical for integration in some examples. Additionally or alternatively, joggle 52 may be positioned between 5-10% of chord length 90 away from leading edge 22. Additionally or alternatively, middle C-channel spar 60 may be positioned between 30%-60% of length 90 away from leading edge 22, such as at about 50% of length 90 away from leading edge 22. In some examples, middle C-channel spar 60 may be positioned for balancing torsional capability within primary structural element 26 on either side of middle C-channel spar 60. At least a portion of upper airfoil surface 70 may be free of features or disruptions in upper skin panel 34, such as at least 20% of length 90 from leading edge 22 towards trailing edge 24. In other words, and in some examples, forming leading edge 22 by continuing upper skin panel 34 around leading edge 22 to lower airfoil surface 72 may reduce drag and thereby improve aerodynamic characteristics in disclosed structural composite airfoils 10.

Figure 3:
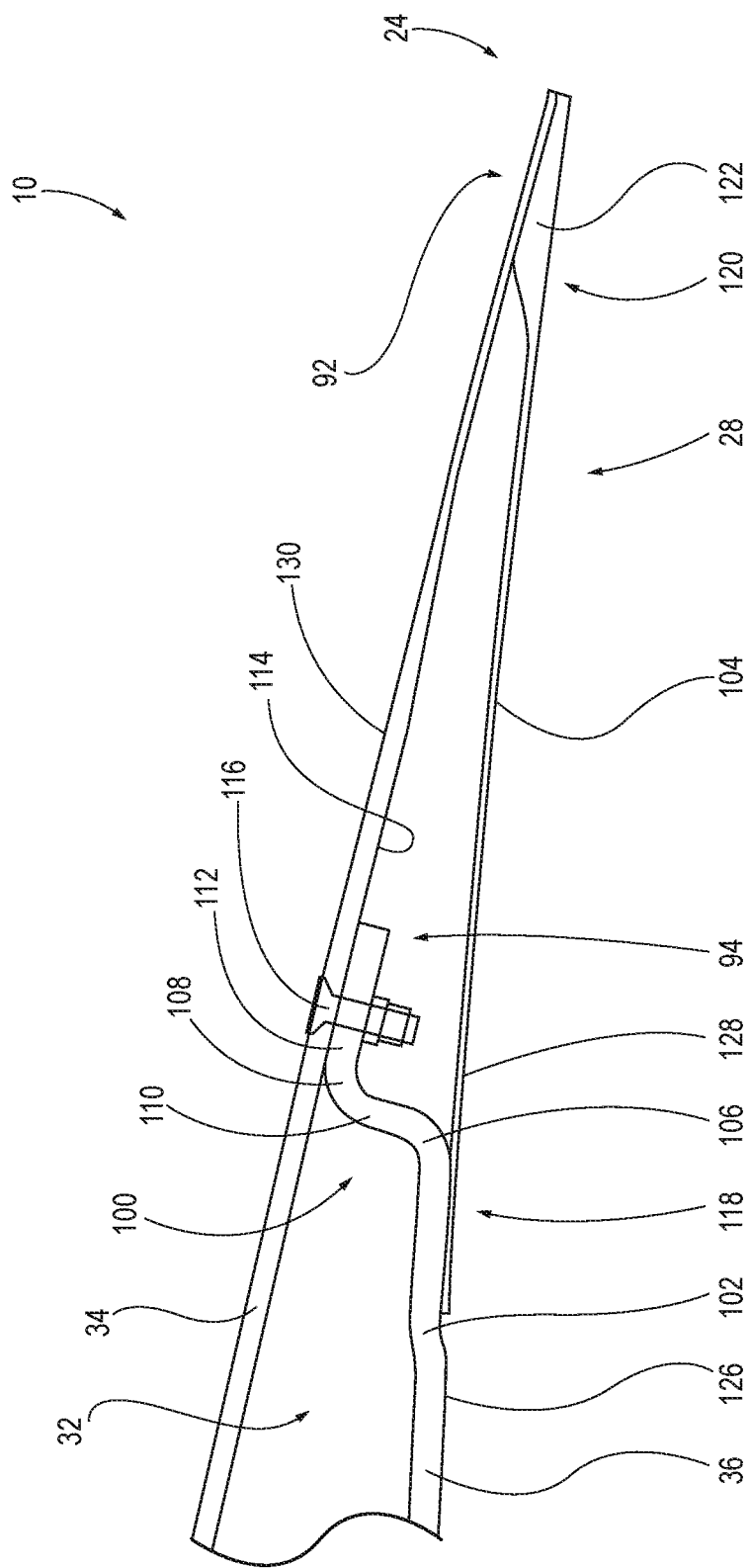
FIG. 3 is a side elevation view of an integral Z-spar formed in the lower skin panel.
Figure 4:
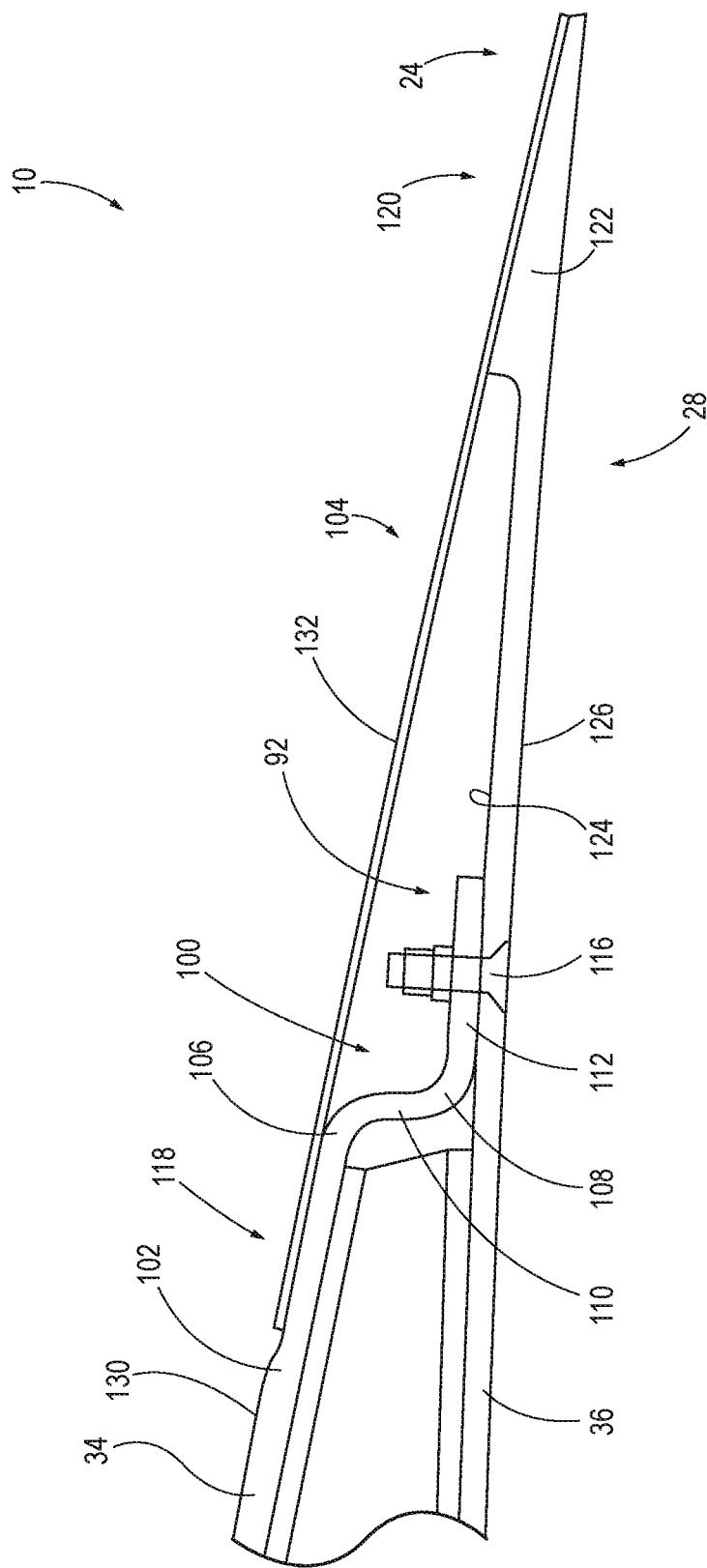
FIG. 4 is a side elevation view of an integral Z-spar formed in the upper skin panel.

Some examples of structural composite airfoil 10 may include an integral Z-spar 100, which may be a part of primary structural element 26, with elements aft of integral Z-spar 100 being part of secondary structural element 28 in some examples. Thus, positioning integral Z-spar 100 aft of middle C-channel spar 60 may lengthen, or extend, the length of primary structural element 26, and/or may increase the percentage of length 90 of structural composite airfoil 10 that corresponds to primary structural element 26. In some examples, said integral Z-spar 100 may be formed within trailing edge region 32 of primary structural element 26. FIGS. 3-4 illustrate examples of such integral Z-spars 100, with FIG. 3 illustrating an example of integral Z-spar 100 formed in lower skin panel 36, and FIG. 4 illustrating an example of integral Z-spar 100 formed in upper skin panel 34. Integrating components such as integral Z-spar 100 into upper skin panel 34 and/or lower skin panel 36 in various examples of structural composite airfoil 10 may allow for a reduction in fasteners and/or overall part count. Integral Z-spar 100 is generally positioned adjacent trailing edge 24 of structural composite airfoil 10, such as by being positioned at least 80% of length 90 away from leading edge 22. In some examples, integral Z-spar 100 may be positioned between 80-95% of length 90 away from leading edge 22.

With reference to FIG. 3, integral Z-spar 100 may be formed in lower trailing edge end 94 of lower skin panel 36. Integral Z-spar 100 may include a first bend 106, a second bend 108, and a first Z-spar segment 110 extending between first bend 106 and second bend 108. In some examples, first Z-spar segment 110 may be at least substantially perpendicular to lower skin panel 36 and/or upper skin panel 34. In some examples, first Z-spar segment 110 may form an angle with lower skin panel 36 that is greater than 90 degrees, and/or greater than 100 degrees. Additionally or alternatively, first Z-spar segment 110 may form an angle with upper skin panel 34 that is greater than 90 degrees, and/or greater than 100 degrees. Integral Z-spar 100 may further include a second Z-spar segment 112 extending aft of second bend 108. Said second Z-spar segment 112 may be coupled to upper skin panel 34, as shown in FIG. 3. In the example shown in FIG. 3, second Z-spar segment 112 is positioned adjacent an interior surface 114 of upper skin panel 34. A Z-spar fastener 116 (which is an example of other fasteners 88) may couple integral Z-spar 100 to upper skin panel 34, thereby also coupling lower trailing edge end 94 to upper skin panel 34. In some examples, Z-spar fastener 116 is recessed into upper skin panel 34 (e.g., such that Z-spar fastener 116 is at least substantially flush or sub-flush with an upper panel surface 130 of upper skin panel 34) and extends through upper skin panel 34 and second Z-spar segment 112 to couple integral Z-spar 100 to upper skin panel 34. In some examples, Z-spar fastener 116 may be accessible from both sides of upper skin panel 34, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

Integral Z-spar 100 may include a Z-spar joggle 102 in lower skin panel 36 that may be configured to receive a portion of a trailing edge closeout cover 104, which may at least partially define secondary structural element 28 and/or trailing edge 24 of structural composite airfoil 10. Z-spar joggle 102 is effectively a small shift in lower skin panel 36 upwards toward upper skin panel 34, and generally is positioned forward of first bend 106. A first cover end region 118 of trailing edge closeout cover 104 may be bonded to lower skin panel 36, as shown in FIG. 3. Additionally or alternatively, first cover end region 118 may be riveted or otherwise fastened or coupled to lower skin panel 36. To create a smooth surface at the interface and improve aerodynamic performance, first cover end region 118 may be slightly recessed into lower skin panel 36, such as via Z-spar joggle 102, as shown in FIG. 3. Z-spar joggle 102 may be tailored to create a greater or smaller recess in lower skin panel 36, depending on the thickness of first cover end region 118, such that a lower panel surface 126 of lower skin panel 36 is substantially flush with a lower cover surface 128 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118. Any gaps remaining at the interface of Z-spar joggle 102 and first cover end region 118 (or elsewhere on structural composite airfoil 10) may be filled with a sealant, a filler material, and/or a resin, and then smoothed.

A second cover end region 120 of trailing edge closeout cover 104 may include an integral wedge 122 that may be coupled (e.g., bonded and/or coupled via one or more fasteners) to upper skin panel 34, as shown in FIG. 3. Alternatively, integral wedge 122 may be integrally formed with upper skin panel 34. In still other examples, integral wedge 122 may be a discrete component separate from trailing edge closeout cover 104 and separate from upper skin panel 34, and which may be bonded or otherwise coupled to upper skin panel 34 and/or trailing edge closeout cover 104. Integral wedge 122 may be formed, for example, by building up plies of material, molding, and/or by machining a mating face profile to mate with upper skin panel 34.

With reference to FIG. 4, integral Z-spar 100 may be formed in upper trailing edge end 92 of upper skin panel 34. In the example shown in FIG. 4, second Z-spar segment 112 is coupled to lower skin panel 36, and is positioned adjacent an interior surface 124 of lower skin panel 36. Z-spar fastener 116 couples integral Z-spar 100 to lower skin panel 36, with Z-spar fastener 116 being recessed into lower skin panel 36 (e.g., such that Z-spar fastener 116 is at least substantially flush or sub flush with lower panel surface 126 of lower skin panel 36) and extending through lower skin panel 36 and second Z-spar segment 112 to couple integral Z-spar 100 to lower skin panel 36. In some examples, Z-spar fastener 116 may be accessible from both sides of lower skin panel 36, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

In FIG. 4, integral Z-spar 100 includes Z-spar joggle 102 in upper skin panel 34 that is configured to receive a portion of trailing edge closeout cover 104, with Z-spar joggle 102 being positioned forward of first bend 106. Z-spar joggle 102 is effectively a small shift in upper skin panel 34 toward lower skin panel 36. First cover end region 118 of trailing edge closeout over 104 is bonded to upper skin panel 34 instead of lower skin panel 36 in this example. Additionally or alternatively, first cover end region 118 may be riveted or otherwise fastened or coupled to upper skin panel 34. To create a smooth surface at the interface and improve aerodynamic performance, first cover end region 118 may be slightly recessed into upper skin panel 34, such as via Z-spar joggle 102, as shown in FIG. 4. Z-spar joggle 102 may be tailored to create a greater or smaller recess in upper skin panel 34, depending on the thickness of first cover end region 118, such that an upper panel surface 130 of upper skin panel 34 is substantially flush with an upper cover surface 132 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118.

Second cover end region 120 of trailing edge closeout cover 104 may include an integral wedge 122 that may be coupled (e.g., bonded and/or coupled via one or more fasteners) to lower skin panel 36. Alternatively, and as shown in FIG. 4, integral wedge 122 may be integrally formed with lower skin panel 36. In still other examples, integral wedge 122 may be a discrete component separate from trailing edge closeout cover 104 and separate from lower skin panel 36, which may be bonded or otherwise coupled to lower skin panel 36 and/or trailing edge closeout cover 104. Integral wedge 122 may be formed, for example, by building up plies of material, molding, and/or by machining a mating face profile to mate with lower skin panel 36.

Figure 5:
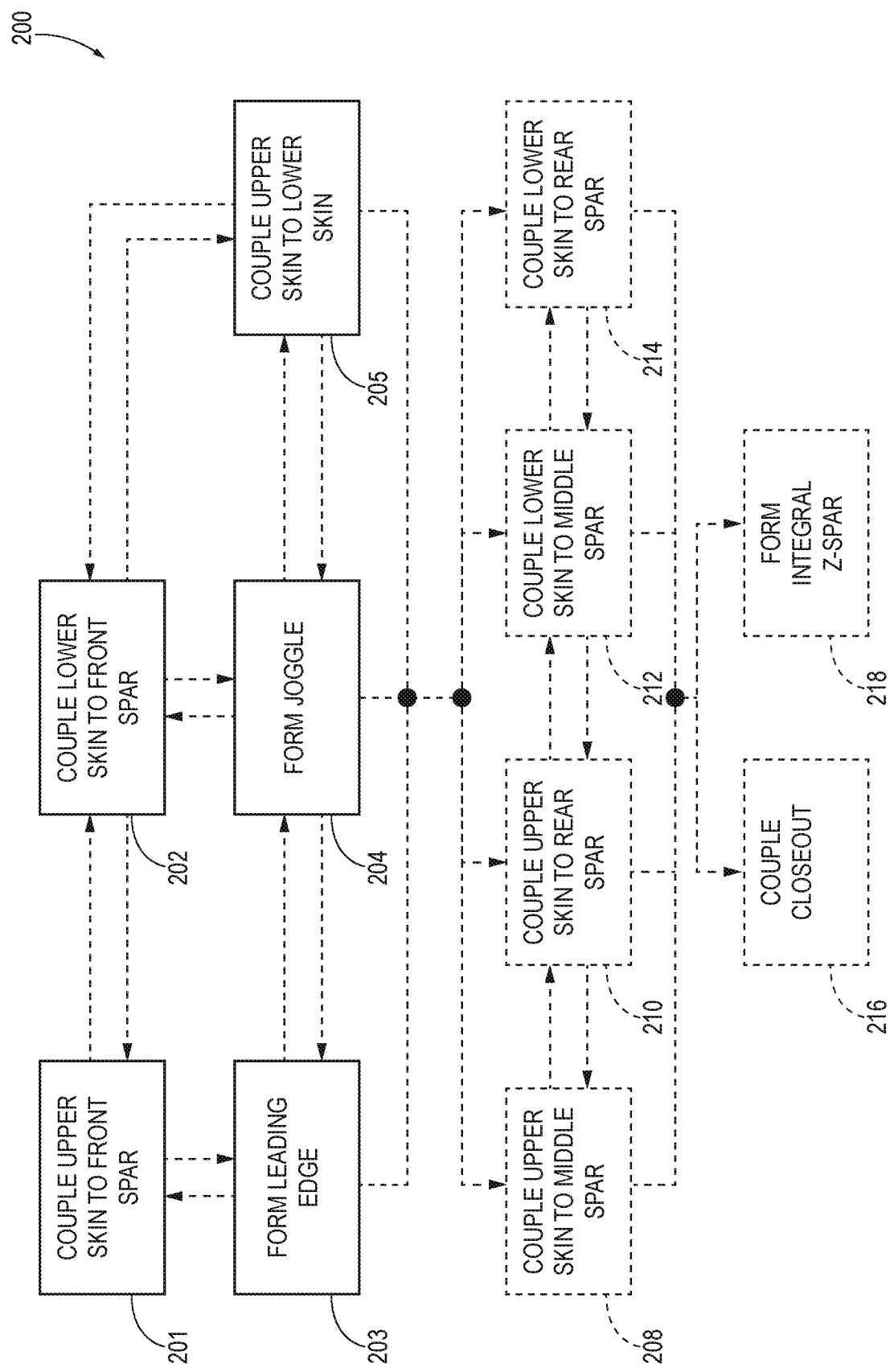
FIG. 5 is a flowchart diagram representing disclosed methods of forming disclosed structural composite airfoils.

FIG. 5 schematically provides a flowchart that represents illustrative, non-exclusive examples of methods 200 according to the present disclosure. In FIG. 5, some steps are illustrated in dashed boxes indicating that such steps may be optional or may correspond to an optional version of a method according to the present disclosure. That said, not all methods 200 according to the present disclosure are required to include the steps illustrated in solid boxes. The methods 200 and steps illustrated in FIG. 5 are not limiting and other methods and steps are within the scope of the present disclosure, including methods having greater than or fewer than the number of steps illustrated, as understood from the discussions herein.

Methods 200 generally include coupling an upper skin panel (e.g., upper skin panel 34) to a front C-channel spar (e.g., front C-channel spar 38), at 201, and coupling a lower skin panel (e.g., lower skin panel 36) to the front C-channel spar, at 202. Coupling the upper skin panel to the front C-channel spar at 201 generally includes coupling the upper skin panel to an upper flange (e.g., upper flange 42) of the front C-channel spar. Similarly, coupling the lower skin panel to the front C-channel spar at 202 generally includes coupling the lower skin panel to a lower flange (e.g., lower flange 44) of the front C-channel spar. As compared to conventional techniques, coupling the upper skin panel at 201 and/or coupling the lower skin panel at 202 may be performed with a reduced number of nut plates or other fastening components.

Methods 200 also include forming a leading edge of the structural composite airfoil (e.g., leading edge 22) with the upper skin panel at 203, forming a joggle in the lower skin panel (e.g., joggle 52), at 204, and coupling the upper skin panel to the lower skin panel at 205. Coupling the upper skin panel to the lower skin panel at 205 generally includes coupling an upper leading edge end (e.g., upper leading edge end 76) to a lower leading edge end (e.g., lower leading edge end 78). Coupling the upper skin panel to the lower skin panel at 205 includes coupling the lower leading edge end to the upper leading edge end such that an upper skin surface of the lower leading edge end (e.g., upper skin surface 54) faces an internal volume of the structural composite airfoil (e.g., internal volume 40), such that a lower skin surface of the lower leading edge end (e.g., lower skin surface 56) faces an internal surface of the upper leading edge end of the upper skin panel (e.g., internal surface 58), thereby forming an overlap between the upper leading edge end and the lower leading edge end. Coupling the lower skin panel to the front C-channel spar at 202 is performed such that the lower skin panel is coupled to the front C-channel spar aft of the joggle, and coupling the upper skin panel to the lower skin panel at 205 is performed such that the lower leading edge end of the lower skin panel is coupled to the upper leading edge end of the upper skin panel forward of the front C-channel spar. Additionally or alternatively, coupling the upper skin panel to the lower skin panel at 205 may be performed without the use of splice straps. Reducing the number of fasteners or fastening components may reduce the weight of the resulting structural composite airfoil, reduce manufacturing costs, and/or reduce manufacturing processing time.

In some examples, method 200 includes coupling the upper skin panel to a middle C-channel spar (e.g., middle C-channel spar 60) at 208, coupling the upper skin panel to a rear C-channel spar at 210, coupling the lower skin panel to the middle C-channel spar at 212, and/or coupling the lower skin panel to the rear C-Channel spar at 214. Additionally or alternatively, methods 200 may include coupling a secondary structural element (e.g., secondary structural element 28), such as a closeout, to the upper skin panel (e.g., upper trailing edge end 92) and/or to the lower skin panel (e.g., lower trailing edge end 94), at 216. Additionally or alternatively, methods 200 may include forming an integral Z-spar (e.g., integral Z-spar 100) in the lower skin panel or upper skin panel, at 218. Forming the integral Z-spar at 218 may include coupling the integral Z-spar to the upper skin panel.

Illustrative, non-exclusive examples of inventive subject matter according to the present disclosure are described in the following enumerated paragraphs:

A1. A structural composite airfoil (10) having a leading edge (22) and a trailing edge (24), the structural composite airfoil (10) comprising:

a primary structural element (26) extending from a leading edge region (30) to a trailing edge region (32), wherein the leading edge region (30) of the primary structural element (26) forms, or is adjacent to, the leading edge (22) of the structural composite airfoil (10), wherein the primary structural element (26) comprises:

an upper skin panel (34) extending from an upper leading edge end (76) to an upper trailing edge end (92);
a lower skin panel (36) extending from a lower leading edge end (78) to a lower trailing edge end (94);
an internal volume (40) defined between the upper skin panel (34) and the lower skin panel (36); and
a front C-channel spar (38) comprising an upper flange (42) coupled to the upper skin panel (34), wherein the front C-channel spar (38) further comprises a lower flange (44) coupled to the lower skin panel (36), wherein the lower skin panel (36) comprises a joggle (52) adjacent the lower leading edge end (78), wherein the joggle (52) is positioned forward of the front C-channel spar (38), wherein an upper skin surface (54) of the lower leading edge end (78) faces the internal volume (40), wherein a lower skin surface (56) of the lower leading edge end (78) faces an internal surface (58) of the upper leading edge end (76) of the upper skin panel (34), wherein the lower leading edge end (78) of the lower skin panel (36) is coupled to the upper leading edge end (76) of the upper skin panel (34) forward of the front C-channel spar (38), and wherein the leading edge (22) has a bullnose shape defined by the upper skin panel (34); and a secondary structural element (28) defining the trailing edge (24) of the structural composite airfoil (10).

A1.1. The structural composite airfoil (10) of paragraph A1, wherein the upper skin panel (34) is continuous from the upper leading edge end (76) to the upper trailing edge end (92).

A1.2. The structural composite airfoil (10) of paragraph A1 or A1.1, wherein the leading edge region (30) of the primary structural element (26) has a bullnose shape defined by the upper skin panel (34).

A2. The structural composite airfoil (10) of any of paragraphs A1-A1.2, wherein the lower trailing edge end (94) is coupled to the upper skin panel (34).

A3. The structural composite airfoil (10) of any of paragraphs A1-A2, wherein the lower skin panel (36) comprises an integral Z-spar (100) at the lower trailing edge end (94).

A3.1. The structural composite airfoil (10) of any of paragraphs A1-A3, wherein the primary structural element (26) comprises an/the integral Z-spar (100).

A3.2. The structural composite airfoil (10) of paragraph A3 or A3.1, wherein the integral Z-spar (100) is formed by the lower skin panel (36) within the trailing edge region (32) of the primary structural element (26).

A3.3. The structural composite airfoil (10) of any of paragraphs A3-A3.2, wherein the integral Z-spar (100) comprises a Z-spar joggle (102) configured to receive a portion of the secondary structural element (28).

A3.4. The structural composite airfoil (10) of any of paragraphs A3-A3.3, wherein the integral Z-spar (100) comprises a first bend (106), a second bend (108), and a first Z-spar segment (110) extending between the first bend (106) and the second bend (108).

A3.5. The structural composite airfoil (10) of paragraph A3.4, wherein the first Z-spar segment (110) is substantially perpendicular to the lower skin panel (36) and/or substantially perpendicular to the upper skin panel (34).

A3.6. The structural composite airfoil (10) of paragraph A3.4 or A3.5, wherein the integral Z-spar (100) further comprises a second Z-spar segment (112) extending aft of the second bend (108), wherein the second Z-spar segment (112) is coupled to the upper skin panel (34).

A3.7. The structural composite airfoil (10) of paragraph A3.6, wherein the second Z-spar segment (112) is adjacent an interior surface (124) of the upper skin panel (34).

A3.8. The structural composite airfoil (10) of paragraph A3.6 or A3.7, wherein the second Z-spar segment (112) is coupled to the upper skin panel (34) via a Z-spar fastener (116), wherein the Z-spar fastener (116) is recessed into the upper skin panel (34), and wherein the Z-spar fastener (116) extends through the second Z-spar segment (112).

A3.9. The structural composite airfoil (10) of any of paragraphs A3-A3.8, wherein the Z-spar fastener (116) is not blind.

A3.10 The structural composite airfoil (10) of any of paragraphs A3-A3.9, wherein the Z-spar fastener (116) comprises a Hi-Lok fastener, a rivet, and/or a lock bolt.

A4. The structural composite airfoil (10) of any of paragraphs A3-A3.10, wherein a/the Z-spar joggle (102) of the integral Z-spar (100) is forward of the first bend (106).

A5. The structural composite airfoil (10) of any of paragraphs A1-A4, wherein the structural composite airfoil (10) has a chord length (90), and wherein a position along the chord length (90) may be defined by a percentage of the distance along the chord length (90) from the leading edge (22).

A6. The structural composite airfoil (10) of paragraph A5, wherein the front C-channel spar (38) is positioned between 0%-10% of the chord length (90) away from the leading edge (22).

A7. The structural composite airfoil (10) of paragraph A6, wherein the front C-channel spar (38) is positioned at about 5% of the chord length (90) away from the leading edge (22).

A8. The structural composite airfoil (10) of any of paragraphs A5-A7, wherein the joggle (52) is positioned between 5-10% of the chord length (90) away from the leading edge (22).

A9. The structural composite airfoil (10) of any of paragraphs A5-A8, wherein an/the integral Z-spar (100) is positioned between 80-95% of the chord length (90) away from the leading edge (22).

A9.1. The structural composite airfoil (10) of any of paragraphs A5-A9, wherein a middle C-channel spar (60) is positioned between 40-60% of the chord length (90) away from the leading edge (22).

A9.2. The structural composite airfoil (10) of paragraph A9.1, wherein the middle C-channel spar (60) is positioned at about 50% of the chord length (90) away from the leading edge (22).

A10. The structural composite airfoil (10) of any of paragraphs A1-A9.2, wherein the lower flange (44) of the front C-channel spar (38) is aft of the joggle (52).

A11. The structural composite airfoil (10) of any of paragraphs A1-A10, wherein the lower flange (44) of the front C-channel spar (38) is adjacent to the joggle (52).

A12. The structural composite airfoil (10) of any of paragraphs A1-A11, wherein a first channel (46) of the front C-channel spar (38) faces the trailing edge (24) of the structural composite airfoil (10).

A13. The structural composite airfoil (10) of any of paragraphs A1-A12, wherein the primary structural element further comprises a/the middle C-channel spar (60) coupled to the upper skin panel (34) and the lower skin panel (36), wherein a second channel (64) of the middle C-channel spar (60) faces the leading edge (22) of the structural composite airfoil (10), wherein the middle C-channel spar (60) is positioned aft of the front C-channel spar (38).

A14. The structural composite airfoil (10) of any of paragraphs A1-A13, further comprising a first fastener (80) coupling the upper skin panel (34) to the upper flange (42) of the front C-channel spar (38).

A15. The structural composite airfoil (10) of any of paragraphs A1-A14, further comprising a second fastener (82) coupling the lower skin panel (36) to the lower flange (44) of the front C-channel spar (38).

A16. The structural composite airfoil (10) of any of paragraphs A1-A15, further comprising a third fastener (84) coupling the upper leading edge end (76) of the upper skin panel (34) to the lower leading edge end (78) of the lower skin panel (36).

A17. The structural composite airfoil (10) of any of paragraphs A1-A16, wherein the upper skin panel (34) is coupled to the lower skin panel (36) without a splice strap.

A18. The structural composite airfoil (10) of any of paragraphs A1-A17, wherein the lower leading edge end (78) is coupled to the upper leading edge end (76) without a/the splice strap.

A19. The structural composite airfoil (10) of any of paragraphs A1-A18, wherein at least a portion of the upper skin panel (34) is core stiffened.

A20. The structural composite airfoil (10) of any of paragraphs A1-A19, wherein at least a portion of the lower skin panel (36) is core stiffened.

A21. The structural composite airfoil (10) of any of paragraphs A1-A20, wherein the upper skin panel (34) comprises fiberglass or carbon fiber.

A22. The structural composite airfoil (10) of any of paragraphs A1-A21, wherein the lower skin panel (36) comprises fiberglass or carbon fiber.

A23. The structural composite airfoil (10) of any of paragraphs A1-A22, wherein the structural composite airfoil (10) is a trailing edge flap (17), an aileron, a flaperon, an air brake, an elevator, a slat, a spoiler, a canard, a rudder, and/or a winglet.

A24. The structural composite airfoil (10) of any of paragraphs A1-A23, wherein the secondary structural element (28) comprises a wedge closeout.

A25. The structural composite airfoil (10) of any of paragraphs A1-A24, wherein the secondary structural element (28) comprises a duckbill closeout.

A26. The structural composite airfoil (10) of any of paragraphs A1-A25, wherein the secondary structural element (28) comprises a bonded closeout.

A27. The structural composite airfoil (10) of any of paragraphs A1-A26, wherein the secondary structural element (28) comprises a riveted closeout.

A28. The structural composite airfoil (10) of any of paragraphs A1-A27, wherein the lower trailing edge end (94) of the lower skin panel (36) is coupled to the upper skin panel (34).

A29. The structural composite airfoil (10) of any of paragraphs A1-A28, wherein the upper trailing edge end (92) of the upper skin panel (34) is coupled to the secondary structural element (28).

A30. The structural composite airfoil (10) of any of paragraphs A1-A29, wherein the structural composite airfoil (10) comprises an upper airfoil surface (70) and a lower airfoil surface (72).

A31. The structural composite airfoil (10) of paragraph A30, wherein the upper airfoil surface (70) is defined by the upper skin panel (34).

A32. The structural composite airfoil (10) of paragraph A30 or A31, wherein the lower airfoil surface (72) is defined by the upper skin panel (34) and the lower skin panel (36).

A33. The structural composite airfoil (10) of any of paragraphs A30-A32, wherein the upper leading edge end (76) of the upper skin panel (34) forms part of the lower airfoil surface (72) of the structural composite airfoil (10).

B1. An aircraft (14) comprising the structural composite airfoil (10) of any of paragraphs A1-A33.

B2. A trailing edge flap (17) for an aircraft (14) comprising the structural composite airfoil (10) of any of paragraphs A1-A33.

C1. A method (200) of assembling a structural composite airfoil (10), the method (200) comprising:

coupling (201) an upper skin panel (34) to a front C-channel spar (38), wherein the structural composite airfoil (10) extends from a leading edge (22) to a trailing edge (24), wherein a first channel (46) of the front C-channel spar (38) faces the trailing edge (24) of the structural composite airfoil (10), wherein the front C-channel spar (38) comprises an upper flange (42), a lower flange (44), and an elongated span extending between the upper flange (42) and the lower flange (44), wherein the coupling (201) the upper skin panel (34) to the front C-channel spar (38) comprises coupling the upper skin panel (34) to the upper flange (42) of the front C-channel spar (38), and wherein the upper skin panel (34) extends from an upper leading edge end (76) to an upper trailing edge end (92);

coupling (202) a lower skin panel (36) to the front C-channel spar (38) such that an internal volume (40) is defined between the upper skin panel (34) and the lower skin panel (36), wherein the upper skin panel (34), the lower skin panel (36), and the front C-channel spar (38) together form at least a portion of a primary structural element (26) of the structural composite airfoil (10), and wherein the lower skin panel (36) extends from a lower leading edge end (78) to a lower trailing edge end (94);

forming (203) the leading edge (22) of the structural composite airfoil (10) with the upper skin panel (34), wherein the leading edge (22) has a bullnose shape;

forming (204) a joggle (52) in the lower skin panel (36), wherein the joggle (52) is adjacent the lower leading edge end (78) of the lower skin panel (36), and wherein the coupling (202) the lower skin panel (36) to the front C-channel spar (38) comprises coupling the front C-channel spar (38) to the lower skin panel (36) aft of the joggle (52); and coupling (205) the lower leading edge end (78) of the lower skin panel (36) to the upper leading edge end (76) of the upper skin panel (34).

C2. The method (200) of paragraph C1, wherein the coupling (205) the lower leading edge end (78) to the upper leading edge end (76) comprises coupling the lower leading edge end (78) to the upper leading edge end (76) such that an upper skin surface (54) of the lower leading edge end (78) faces the internal volume (40), such that a lower skin surface (56) of the lower leading edge end (78) faces an internal surface (58) of the upper leading edge end (76) of the upper skin panel (34), and such that the lower leading edge end (78) of the lower skin panel (36) is coupled to the upper leading edge end (76) of the upper skin panel (34) forward of the front C-channel spar (38).

C3. The method (200) of paragraph C1 or C2, further comprising coupling (208) the upper skin panel (34) to a middle C-channel spar (60), wherein the middle C-channel spar (60) is aft of the front C-channel spar (38), and wherein a second channel (64) of the middle C-channel spar (60) faces the leading edge (22) of the structural composite airfoil (10).

C4. The method (200) of any of paragraphs C1-C3, further comprising coupling (212) the lower skin panel (36) to a/the middle C-channel spar (60), such that the middle C-channel spar (60) is part of the primary structural element (26).

C5. The method (200) of any of paragraphs C1-C4, wherein the structural composite airfoil (10) is the structural composite airfoil (10) of any of paragraphs A1-A33.

C6. The method (200) of any of paragraphs C1-05, wherein the coupling (205) the lower leading edge end (78) of the lower skin panel (36) to the upper leading edge end (76) of the upper skin panel (34) is performed without using a/the splice strap.

C7. The method (200) of any of paragraphs C1-C6, further comprising coupling (216) a/the closeout to the upper skin panel (34) and the lower skin panel (36), wherein the closeout defines the trailing edge (24) of the structural composite airfoil (10).

C8. The method (200) of any of paragraphs C1-C7, further comprising forming (218) an/the integral Z-spar (100) in the lower skin panel (36).

C9. The method (200) of paragraph C8, further comprising coupling the integral Z-spar (100) to the upper skin panel (34).

D1. The use of the structural composite airfoil (10) of any of paragraphs A1-A33 as an inboard flap (17) for an aircraft (14).

D2. The use of the structural composite airfoil (10) of any of paragraphs A1-A33 as an outboard flap (17) for an aircraft (14).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A structural composite airfoil having a leading edge and a trailing edge, the structural composite airfoil comprising:
    a primary structural element extending from a leading edge region to a trailing edge region, wherein the primary structural element comprises:
    an upper skin panel extending from an upper leading edge end to an upper trailing edge end;
    a lower skin panel extending from a lower leading edge end to a lower trailing edge end;
    an internal volume defined between the upper skin panel and the lower skin panel; and
    a front C-channel spar comprising an upper flange coupled to the upper skin panel, wherein the front C-channel spar further comprises a lower flange coupled to the lower skin panel, wherein the lower skin panel comprises a joggle adjacent the lower leading edge end, wherein the joggle is positioned forward of the front C-channel spar, wherein an upper skin surface of the lower leading edge end faces the internal volume, wherein a lower skin surface of the lower leading edge end faces an internal surface of the upper leading edge end of the upper skin panel, wherein the lower leading edge end of the lower skin panel is coupled to the upper leading edge end of the upper skin panel forward of the front C-channel spar, wherein the leading edge has a bullnose shape defined by the upper skin panel, wherein the structural composite airfoil has a chord length, wherein a position along the chord length is defined by a percentage of a distance along the chord length from the leading edge, and wherein the joggle is positioned between 5-10% of the chord length away from the leading edge; and
    a secondary structural element defining the trailing edge of the structural composite airfoil.

2. The structural composite airfoil according to claim 1, wherein the lower trailing edge end is coupled to the upper skin panel.

3. The structural composite airfoil according to claim 1, wherein the lower skin panel comprises an integral Z-spar at the lower trailing edge end.

4. The structural composite airfoil according to claim 3, wherein the integral Z-spar is formed by the lower skin panel within the trailing edge region of the primary structural element, wherein the lower trailing edge end is coupled to the upper skin panel via a Z-spar fastener, and wherein the Z-spar fastener is not blind.

5. The structural composite airfoil according to claim 1, wherein the lower flange of the front C-channel spar is adjacent to the joggle.

6. The structural composite airfoil according to claim 1, wherein the leading edge region of the primary structural element forms the leading edge of the structural composite airfoil.

7. The structural composite airfoil according to claim 1, further comprising a middle C-channel spar coupled to the upper skin panel and the lower skin panel, wherein a second channel of the middle C-channel spar faces the leading edge of the structural composite airfoil, wherein the middle C-channel spar is positioned aft of the front C-channel spar.

8. The structural composite airfoil according to claim 1, wherein the upper skin panel is coupled to the lower skin panel without any splice straps.

9. The structural composite airfoil according to claim 1, wherein the upper skin panel is continuous from the upper leading edge end to the upper trailing edge end.

10. The structural composite airfoil according to claim 1, wherein the structural composite airfoil comprises an upper airfoil surface and a lower airfoil surface, wherein the upper airfoil surface is defined by the upper skin panel, and wherein the upper leading edge end of the upper skin panel forms part of the lower airfoil surface.

11. The structural composite airfoil according to claim 1, wherein the structural composite airfoil is a trailing edge flap, an aileron, a flaperon, an air brake, an elevator, a slat, a spoiler, a canard, a rudder, and/or a winglet.

12. The structural composite airfoil according to claim 1, wherein the secondary structural element comprises a duckbill closeout.

13. The structural composite airfoil according to claim 12, wherein the duckbill closeout is bonded to the upper skin panel.

14. The structural composite airfoil according to claim 1, wherein the lower trailing edge end of the lower skin panel is coupled to the upper skin panel at a position forward of the upper trailing edge end.

15. An aircraft comprising the structural composite airfoil according to claim 1.

16. A trailing edge flap for an aircraft comprising the structural composite airfoil according to claim 1.

17. A method of assembling a structural composite airfoil, the method comprising:

coupling an upper skin panel to a front C-channel spar, wherein the structural composite airfoil extends from a leading edge to a trailing edge, wherein a first channel of the front C-channel spar faces the trailing edge of the structural composite airfoil, wherein the front C-channel spar comprises an upper flange, a lower flange, and an elongated span extending between the upper flange and the lower flange, wherein the coupling the upper skin panel to the front C-channel spar comprises coupling the upper skin panel to the upper flange of the front C-channel spar, and wherein the upper skin panel extends from an upper leading edge end to an upper trailing edge end;

coupling a lower skin panel to the front C-channel spar such that an internal volume is defined between the upper skin panel and the lower skin panel, wherein the upper skin panel, the lower skin panel, and the front C-channel spar together form at least a portion of a primary structural element of the structural composite airfoil, and wherein the lower skin panel extends from a lower leading edge end to a lower trailing edge end;

forming the leading edge of the structural composite airfoil with the upper skin panel, wherein the leading edge has a bullnose shape;

forming a joggle in the lower skin panel within the primary structural element, wherein the joggle is adjacent the lower leading edge end of the lower skin panel, wherein the structural composite airfoil has a chord length, wherein a position along the chord length is defined by a percentage of a distance along the chord length from the leading edge, and wherein the forming the joggle comprises forming the joggle such that the joggle is positioned between 5-10% of the chord length away from the leading edge, and wherein the coupling the lower skin panel to the front C-channel spar comprises coupling the front C-channel spar to the lower skin panel aft of the joggle; and coupling the lower leading edge end of the lower skin panel to the upper leading edge end of the upper skin panel.

18. The method according to claim 17, wherein the coupling the lower leading edge end to the upper leading edge end comprises coupling the lower leading edge end to the upper leading edge end such that an upper skin surface of the lower leading edge end faces the internal volume, such that a lower skin surface of the lower leading edge end faces an internal surface of the upper leading edge end of the upper skin panel, and such that the lower leading edge end of the lower skin panel is coupled to the upper leading edge end of the upper skin panel forward of the front C-channel spar.

19. The method according to claim 17, further comprising:

forming an integral Z-spar in the lower skin panel; and
coupling the integral Z-spar to the upper skin panel.

* * * * *